US012536888B2

(12) United States Patent
Givon

(10) Patent No.: US 12,536,888 B2
(45) Date of Patent: Jan. 27, 2026

(54) METHODS CIRCUITS DEVICES SYSTEMS AND FUNCTIONALLY ASSOCIATED MACHINE EXECUTABLE INSTRUCTIONS FOR INCIDENT PREDICTION AND HANDLING

(71) Applicant: Dor Givon, Herzliya (IL)

(72) Inventor: Dor Givon, Herzliya (IL)

(*) Notice: Subject to any disclaimer, the term of this patent is extended or adjusted under 35 U.S.C. 154(b) by 10 days.

(21) Appl. No.: 18/502,019

(22) Filed: Nov. 5, 2023

(65) Prior Publication Data
US 2025/0148894 A1 May 8, 2025

(51) Int. Cl.
G08B 21/04 (2006.01)
(52) U.S. Cl.
CPC .................. G08B 21/043 (2013.01)
(58) Field of Classification Search
CPC .................................. G08B 21/043
See application file for complete search history.

(56) References Cited

U.S. PATENT DOCUMENTS

| | | | |
|---|---|---|---|
| 2018/0176518 A1* | 6/2018 | Park | G06V 20/40 |
| 2022/0405506 A1* | 12/2022 | Taamazyan | B25J 15/0608 |
| 2023/0177962 A1* | 6/2023 | Zhang | G08G 1/052 |
| | | | 340/907 |
| 2023/0227025 A1* | 7/2023 | Kuramochi | B60W 50/0097 |
| | | | 701/301 |
| 2023/0234572 A1* | 7/2023 | Iwase | B60W 30/09 |
| | | | 701/301 |
| 2023/0234579 A1* | 7/2023 | Ugajin | B60W 30/0956 |

* cited by examiner

Primary Examiner — Travis R Hunnings
(74) Attorney, Agent, or Firm — Vladimir Sherman

(57) ABSTRACT

The present application discloses and claims methods, circuits, devices, systems and machine executable for scene monitoring and mitigating incidents in a monitored scene. Embodiments of the present invention include a machine-based scene monitoring system comprising with one or more scene monitoring sensor focused on a coverage area of the system and configured to convert sensed information from the coverage area into digital information feeds processable. Feature extraction and classification processors receive the scene sensor feeds and extract, classify and characterize scene element features, such as objects and subjects, appearing within the feeds, wherein said processors also classify actions taken by subjects appearing in the feeds and classifying the scene based on appearing objects, subjects and actions. Embodiments include tracking movements of subjects in the scene, estimating risk probabilities and automatically intervening in the event a risk probability exceeds a threshold or an incident is detected.

8 Claims, 15 Drawing Sheets

Raw Image

Image With Distortion Indicating Lines

Claclulated Image Compensation Vectors

Clean and Compensated Image

METHODS CIRCUITS DEVICES SYSTEMS AND FUNCTIONALLY ASSOCIATED MACHINE EXECUTABLE INSTRUCTIONS FOR INCIDENT PREDICTION AND HANDLING

FIELD OF THE INVENTION

The present invention generally relates to the fields of artificial intelligence and computer scene monitoring. More specifically, the present invention relates to methods, circuits, devices, systems, and functionally associated machine executable code for predicting and preventing dangerous and possibly harmful incidents, alert situations or alert conditions within a system monitored scene.

BACKGROUND

Closed-circuit television (CCTV), also known as video surveillance, refers to the use of video cameras to transmit a signal to a specific place, on a limited set of monitors. It differs from broadcast television in that the signal is not openly transmitted, though it may employ point-to-point (P2P), point-to-multipoint (P2MP), or mesh wired or wireless links. Though almost all video cameras fit this definition, the term is most often applied to those used for surveillance in areas that may need monitoring such as banks, stores, and other areas where security is needed. Though videotelephony is seldom called 'CCTV' one exception is the use of video in distance education, where it is an important tool.

Video based monitoring and surveillance has a long history starting with an early mechanical CCTV system developed in June 1927 by Russian physicist Léon Theremin (cf. Television in the Soviet Union). The system comprised a manually operated scanning-transmitting camera and wireless shortwave transmitter and receiver, with a resolution of a hundred lines. Another early CCTV system was installed by Siemens AG at Test Stand VII in 1942. In the U.S. the first commercial closed-circuit television system became available in 1949, called Vericon.

Early video surveillance systems involved constant human monitoring because there was no way to record and store information and there were no computer vision AI systems to interpret in real-time object and events appearing on video surveillance feeds. The development of reel-to-reel media enabled the recording of surveillance footage. These systems required magnetic tapes to be changed manually, which was a time consuming, expensive and unreliable process, with the operator having to manually thread the tape from the tape reel through the recorder onto an empty take-up reel. Due to these shortcomings, video surveillance was not widespread. VCR technology became available in the 1970s, making it easier to record and erase information, and the use of video surveillance became more common thereafter. During the 1990s, digital multiplexing was developed, allowing several cameras to share a communication line, record at the same time, as well as time lapse and motion-only recording. This saved time and money which then led to an additional increase in the use of CCTV.

The applications for video (CCTV) surveillance are numerous and the use of CCTV cameras is ubiquitous. Surveillance of the public using CCTV is now common in many areas around the world. There are an estimated 350 million surveillance cameras worldwide as of 2016, about 65% of these cameras are installed in Asia. In addition to public surveillance applications, industrial plants and other unsafe venues can use CCTV to observe parts of a process from a central control room, for example when the environment is not suitable for humans. CCTV systems may operate continuously or only as required to monitor a particular event. A more advanced form of CCTV, utilizing digital video recorders (DVRs), provides recording for possibly many years, with a variety of quality and performance options and extra features (such as motion detection and email alerts). More recently, decentralized IP cameras, perhaps equipped with megapixel sensors, support recording directly to network-attached storage devices, or internal flash for completely stand-alone operation.

Additional recent CCTV technology extensions have enabled a shift toward Internet-based camera products and systems for individual use, for example to monitor a home or child. The use of home installed internet accessible cameras has become a prevalent form of do-it-yourself home monitoring and security. Like many do you-it-yourself options, however, the available feature sets for personally accessible internet cameras are simplistic and, in many ways, limited. Unlike commercial video camera monitoring services where a human interprets content within video feeds, most internet cameras provide little to no video feed content extraction, interpretation and scene understanding either via human or machine video feed content analytics.

For the most part, internet accessible home video cameras come with very basic sound or motion detectors triggering alert condition notification generators. Systems using this combination of simple detectors and notification engines, due to limited understating capacity the need to avoid failures in alert condition detection (i.e. false negative), are characterized by the generation of a large number of false alarm notifications which are sent to users, which in many cases leads the users to deactivate the detection/notification features.

Even in commercial or professional video analytics systems, feature extraction, interpretation and alert notification generation is crude and often tedious on the user, often to the point of being ignored or deactivated. There is a need in the field of sensor-based location or scene monitoring for improved artificial intelligence-based video analytics, interaction and notifications. There is a need in the field of sensor-based location or scene monitoring for improved machine based alert condition detection, assessment and alert condition notification generation, especially when the detection pertain to human health or injury.

Some of the more vulnerable to injury at home are the elderly, who often live alone and without significant interaction with caregivers and others, not even family members. These people can fall and injure themselves to the point of not being able to get up, in the short term, and or recover, in the long term. When such injuries, preventable, do occur, the recovery time is very slow and related service are expensive—if recovery is even possible. There is a need to apply modern monitoring and AI technologies to address the needs of the elderly and sick, to: (1) mitigate possible injuries; and (2) to handle (e.g. alert caregiver, etc.) injuries those which could not be prevented.

SUMMARY OF INVENTION

The present invention includes methods, circuits, devices, systems and functionally associated machine executable instructions for artificial intelligence based physical incident and or injury mitigation, detection and handling. According to some embodiments of the present invention, there may be provided an image acquisition and image processing platform adapted to receive one or more video feeds from cameras, and optionally from other sensors, directed towards a coverage area of a scene (e.g. workplace, residence or otherwise regularly frequented location) within which at least one subject of interest may be present. A Monitoring system according to embodiments, may include image, and other sensor data, processing systems which include instructions, algorithms and artificial intelligence (e.g. neural networks) to enable the systems to identify, classify and distinguish between scene background and dynamic elements or subject (e.g. people, dogs, etc.), which dynamic elements/subjects may either be moving or may be still within the scene.

Embodiments of the present invention may include artificial intelligence to predict possible collisions between one or more subjects, such as people, moving within the scene with other subject or objects within the scene. The artificial intelligence of the present invention may be configured to perform systemic monitoring of one or more scene elements, including static or dynamic objects, and including one or more subjects, such as humans or animals.

Scene monitoring and or image processing systems according to embodiments may be adapted to, for at least some of the embodiments of the present invention, generate one or more scene background (object) vector maps correlating image pixels or groups of pixels showing a background object in a camera feed image with an actual location, designation and/or characterizations of the object actually present within the scene. The scene background vector map correlate objects shown in the camera feed image pixels, and it may be used by the system to localize and classify such static objects as floors, walls, doors, tables, chairs, etc. This object vector map be updated as objects are moved around and their new locations are identified by the system.

Scene monitoring and image processing systems according to embodiments of the present invention may be adapted to identify subjects, moving or still, appearing within one or more images from one or more video feeds from cameras focused on a monitored coverage area. The image processing system may also extract from one or a set of video feed images characterization information about subjects (people, children and other creatures) identified within the camera feed images. Subject positioning, orientation and velocity may be estimated per frame, in at least some frames, by at least partially referencing prior and or future frames from the scene. Characterization information about a subject, such as height, weight and velocity, may be estimated according to a variety of computer vision techniques, possibly by referencing the known characteristic of objects having known features/dimension from a background vector map of the monitored scene or coverage area. The known size and location of given background mapped objects can be used as an estimation base point when estimating the size, and location of a subject found to be interacting or in proximity with one or more of given mapped object.

By comparing a subject's appearance/pose in a scene relative to known positions of static item indicated in the vector map, relative distances may be estimated. By matching a silhouette of the subject with a two-dimensional projection of a three-dimensional human model in a specific orientation (e.g. possible human pose), it's possible to deduct the 3D position and orientation of each visible limb in the image. The dynamic edge vectors mentioned above may be overlayed onto the silhouette of the subject for to provide motion direction information relating to each part of the subject's body—not all parts of the body move in the same direction as the body's center of gravity all time.

Combing a subject's position, orientation and direction information, with a cross-reference to locations of static object using the background vector map may be used to estimate a subject's trajectory through the coverage area. In cases with only one subject in the coverage area, there should be only one estimated trajectory, that of the person moving. Collisions in such situation are only possible if the subject(s) under monitoring has a trajectory intersecting a location of one or more objects in the scene. With two or more subjects in a scene/coverage-area, trajectory estimates indicating a concurrent intersection/crossing of the two trajectories may be of concern for potential injury to one or both of the subjects. On the other hand, the intersection could indicate the two subjects are converging at a table for a coffee, a discussion and/or a meal.

In addition to just monitoring instantaneous direction vectors or complete trajectories of subjects, systems according to embodiments may also extract subject features from images and series of image frames in which to enable it to estimate motion dynamics of the monitored subjects in the video feed. In addition to motion dynamics, an image processing and feature extraction system according to embodiments of the present invention may also monitor and classify: (1) an emotional state of monitored subject, (2) stress-levels of monitored subjects; (3) cognitive conditions of monitored subjects; (4) mobility or physical conditions of monitored subjects; and (5) walking gait, with or without upper body cyclical walking movements, of monitored subjects.

System according to embodiments of the present invention may generate, maintain and update a separate profile for each monitored subject/person. Each profile may include estimated or classified characteristics or attributes of the respective subject, wherein the characteristic or attributes may of any type which may be detectable using video and audio feeds. Additional embodiments of the present invention may include a set of connected and wearable health monitoring devices which could be used (e.g. scale and BP cuff) and or worn (e.g. watch, bracelet or band) by the monitored subjects and which can report bio-signs including heartrate, activity levels, blood oxygen levels, ECG, stress levels, etc. The profile characteristic and attributes compiled for each monitored subject may be static, dynamic, physical, biometric, emotional and/or psychological.

Each monitored subject's profile may provide a snapshot of the subject's current overall wellness (e.g. wellness score) and thus indicative of risk of disease and/or injury. Measured or otherwise assessed parameters, in view of their respective profile, may indicate a subject's current mobility, cognition, stability and overall wellness and may be factored in deciding whether a system intervention is required in accordance with embodiments of the present invention. System intervention may include direct alert notifications or other communication with a subject being monitored, and or with alert notification or other communication with a subject's caregiver.

Cognition or the absence thereof, disorientation or complete phasing out, may be a major parameter being monitored for and assessed by systems according to embodiments of the present invention. Such parameters and their trends expressed by a monitored subject may be major factors in maintaining an incident risk estimate consistently high for the subject. System according to embodiment of the present invention may attempt to mitigate risk of phasing out using audible instructions and/or strobing lights to bring a subjects attention back to the present moment and situation.

Embodiments of the present invention may track positions and motions of subjects being monitored. Sets of tracked motions may be translated by the system's artificial intelligence into a behavior classification. Repeating behaviors of a monitored subject may be detected and analyzed to determine behavioral patterns, including worktimes, return home times, bathroom times, dinner time, etc. According to further embodiments, the monitoring system may monitor, detect and record in a subject's profile their behavioral patterns, and optionally the subject's daily, weekly and monthly routines. A monitoring system according to embodiments may also be configured to detect or identify a subject's deviation from behavioral patterns or routines. A system according to embodiments may be adapted to issue notifications when a subject deviates from a known behavioral pattern or routine, especially if the subject's profile or recent estimate indicate they are not well, physically or cognitively.

Collision and/or fall mitigation for a monitored subject may be performed by a monitoring system according to embodiments. The image processing according to embodiments may be adapted to detect dynamic moving subjects in a scene for which a background vector map is available. The image processing system according to embodiments may be configured to estimate a moving subject's distance, orientation and trajectory relative to one or more static background objects in the scene or relative to other people in the scene. Accordingly, for at least some image frames, a system in accordance embodiments of the present invention may calculate a probability of collision or impact between the monitored subject and other objects visible in the scene, including possibly chairs, table, couches, rugs, TV's, walls and floors. A fall can be considered to be collisions between a monitored subject and a floor, or some other short vertical object.

Upon an estimated probability of a collision between a monitored subject and some other object or subject reaching a threshold level (e.g. the subject is walking quickly and nearing an out of place chair or into another person), the system according to embodiments of the present invention may generate an alert to the subject, either audible, visual or tactile (e.g. activate a buzzer worn by the subject). The alert can be generated through a speaker, some flashing light or screen or through a mobile electronic device carried or worn by the subject. Additionally, the system may generate and send an alert to a third party's (e.g. caregiver's) communication device. Upon an estimated probability of a collision between the monitored subject and some other object or subject, the system may prime for emergency actions including: (1) sending alert notification to several parties according to an escalation protocol, (2) calling emergency services, and (3) sending or posting an audio/video message including the possible collision to caregivers and/or emergency services.

A probability of a collision between a monitored subject and some other object or subject may be calculated as the monitored subject moves around within a monitored scene. If, for example, the subject movements are fast and accelerating towards an object and/or a distance between the subject and the given subject decreases rapidly, the system's probability value associated with the subject being involved in a collision may increase. If a cognitive or mobility related condition of a given subject appears to be degrading based on detection of example scenarios such as, for example: (a) Grandma is taking longer and longer to find and put her hat on when leaving her the monitored coverage area; (b) Grandpa is stopping and staring into nowhere for several seconds to several minutes at a time, amongst many other examples, the probability value associated with the given subject's likelihood of a collision may by default be estimated higher, irrespective of other concurrent risk factors detected in connection with the given subject and a possible collision. The higher the estimated probability value of a collision or fall associated with a subject, the more sensitive and/or more robust the collision detector assigned to monitor that subject may be. Sensitivity, accuracy and robustness of a video-feed based fall/collision detector is at least partially a function of allocated processing resources—monitoring of subject's estimated to be at risk of collision due to cognitive and or physical impairment may lead to the system assigning additional resources to a detector (module or set of routines) assigned to the at risk subject.

Risk collision, including risk of collision with a floor (i.e. a fall) is one category of risks assessed by system of the present invention. Risk of any possible incident which may predicted from scene data feeds and which may cause harm to someone, and/or should addressed, are anticipated as part of the present invention.

The collision/fall detector referenced in this application are part of a larger class of detectors referred to herein as "incident detectors." Incident detectors may be comprised of AI configure or trained to assess with a specific set of detected, movements, actions or inactions, within specific context constitute an "incident" which may or has brought harm onto someone and should be reported addressed in some way.

Monitored subjects/persons whose collision probability value or level has been raised or heightened by the system, either due to mobility or cognitive impairments, or absent-minded movements towards and sometime through objects, may be assigned a collision detector for collision detection and remediation. An activated collision detector according to embodiments may, according to some embodiments, receive image frame groups/series (e.g. videos) within which the collisions are visible. Collisions may be detected according any one or a combination of computer vision and AI related techniques developed in accordance with embodiments of the present invention. Additionally, any fall or collision detection algorithms or AI model, known today or to be developed in the future, may be applicable to the present invention.

A monitoring system or its collision detector according to embodiments may detect a collision between a monitored subject and an object or subject within a coverage area of one or more of the system's cameras. A collision detection, or determination of collision, including a collision with the floor (a fall), according to embodiments may include a combination of one or more of the following occurrent detection steps: (1) detection that a subject's trajectory is intersecting with a position of a given object or a trajectory of another moving subject in the scene; (2) detection of an abrupt deceleration or bounce back movement once the subject reaches the given object or subject; (3) detection that the subject's torso and legs have or are becoming parallel with and/or adjacent to a floor or other surface horizontal surface; (4) detection that the subject has gone still (e.g. no mini or micro movements) and/or quiet (no usually audible sounds) at or about reaching a given object as faster than usual speed; and (5) detection that the subject's legs and torso have remained parallel and/or adjacent with a horizontal surface for some threshold period (e.g. 7 minutes) of time after going still. Any one or a combination of these detected situations can be set as a trigger for a collision or fall.

According to embodiments, collision detection or detector sensitivity may be customized based on the subject being monitored. For a given subject being monitored by a system or its respective collision detector, which specific combination of detectable occurrences to factor when determining whether a collision or fall has occurred may be selected based on a collision/fall probability value most recently estimated for the given subject. Additionally, time/speed related threshold values used in calculating decision points for each of those occurrences may be selected or adjusted by a controller at least partially based on a collision/fall probability value most recently estimated for the given subject being monitored.

Timing and format of alert notifications relating with a collision detection for the given person may be at least partially selected based on a previously assessed mobility and/or cognitive condition estimation of the given subject and optionally which occurrences were detected. For example, if the subjected has been assessed as having limited cognitive abilities and or is lying still after a detected fall, the system according to embodiments may immediately generate and send one or more alert notifications to one or more care givers, according to some escalation protocol. If, on the other hand, the subject was previously assessed as being in good cognitive and physical condition, and they are moving and communicative after the collision, the system may be configured to interact with the given subject before deciding to issue an alert notification to a third party.

Embodiments of the present invention include methods, circuits, devices, systems and associated machine executable code for assessing an alert condition within a computer (machine) monitored scene. Embodiments of the present invention may include or be otherwise functionally associated with artificial intelligence based location and scene monitoring technologies including captured video digital processing and analysis, sound digital processing and analysis, environmental condition sending processing and analysis, and computer learning. There may be provided in accordance with embodiments of the present invention an alert condition detector to receive and process scene characterization information digitally derived and generated from outputs of one or more scene sensors (e.g. image sensor, acoustic sensor, temperature sensor, smart watch sensor etc.) whose sensing is directed at a coverage area of the alert condition detector. Scene characterization information may be generated at least partially using artificial intelligence type processing on sensor output data, such as for example computer vision processing and feature extraction, image feature classification (e.g. using neural networks), audio feature processing and feature extraction (e.g. using neural networks), audio feature classification, trend detection processing, etc. which converts raw sensor output data into scene characterization information.

Scene information generated by an artificial intelligence based scene monitoring processor or engine according to embodiments of the present invention may include: (a) object detection, (b) object localization, (c) object classification, (d) object identification, (e) subject detection, (f) subject localization, (g) subject type classification, (h) subject identification, (i) subject activity classification, (j) subject state classification, (k) environmental conditions, (l) scene context classification, and the histories and trends relating to this scene information. According to embodiments, scene sensor feed processing may provide detection, classification and or characterization of a dynamic set of scene elements, which elements may include: objects, subjects/personas, events, actions, scene conditions (lighting temp, etc., scene context (family watching tv or eating dinner, elderly person alone, child with caretaker, etc.) and trends relating to any one or more other elements. The set of scene element monitorable by a system according to embodiments of the present invention may be extended based on extended programming and or based on training and feedback during operation.

Embodiments of the present invention may include alert condition detection and notification. An alert condition detector according to embodiments of the present invention may factor some or all of the above listed scene elements and information when assessing whether an alert condition exists and whether to generate or trigger the generation of an alert condition notification, wherein factoring may include using both predefined and dynamically derived/adjusted scene information factoring. Scene information factoring to assess whether some combination of scene elements (e.g. scene events, subjects present in scene, environment conditions, scene situation characterization, etc.), as characterized by a scene monitoring processor or engine according to embodiments of the present invention, corresponds to an alert condition of a specific alert condition type may be performed by processing circuits or blocks including one or more rule engines and/or one or more neural networks. An alert condition detector according to embodiments of the present invention may include processing blocks or circuits that are adapted to correlate one or a combination of presently characterized/detected scene elements provided by the scene monitoring processor/engine with an alert condition of a specific alert condition type. Various alert condition types, such as for example: (a) stranger in the home, (b) elderly person falling or staggering, (c) kids are crying, etc., along with respective scene elements whose presence correlates to an alert condition of a specific alert condition type may be stored as alert condition parameters within a data store associated with the processing blocks/circuits. A detection rule engine may compare present/detected scene element combinations with stored parameters to determine whether and which alert conditions may be present.

An alert condition detection parameter for detection of a specific alert condition type or classification may be a complex vector or data structure (e.g. XML, JSON, etc.) including at least one alert condition related factor and possibly some magnitude value. In some cases the parameter may be a very complex set of identifiers and values. Alert condition detection parameters may be either static or dynamic in nature depending on the nature of the alert condition with which they are associated. Static parameters may keep their default value irrespective of how a recipient of a corresponding alert condition notification which was triggered at least partially by the static parameter responds to the notification. Dynamic alert condition detection parameters may have one or more values therein adapted based on how a recipient of a corresponding alert condition notification which was triggered at least partially by the dynamic parameter responds to the notification. For example, an alert parameter associated with detecting a fire in a house type or class of alert conditions will not be changed if upon actual alert condition detection and delivery of alert condition notification, one of the alert condition notification recipients is slow to respond (e.g. was watching sports and away from phone). This alert condition detection parameter is considered to be static. Conversely, a dynamic alert condition notification parameter for an alert condition type such as for example strangers walking on a front lawn, may be adjusted to either increase or decrease a threshold detection value controlling how many people must be detected on the lawn before finding/triggering an alert condition detection. This parameter value adjustment, or another adjustment of the parameter, such as for example changing a designator of the boundary of the front lawn, may be made responsive to feedback from recipients of alert condition notifications related to the dynamic parameter. Generally, poor responsiveness may cause the parameter to be modified so as to reduce associated alert condition detections. Fast and energetic responses to alert notifications resulting from the dynamic parameter may result in the parameter being modified to increase sensitivity and increase alert notification triggers.

According to some embodiments of the present invention, alert notification parameters for a specific alert condition may be generated using a sample video feed. A user of the system may designate activity appearing in a portion or segment of a video feed as presenting/showing an alert condition, of a type the user may designates or name arbitrarily. A system according to embodiments of the present invention may extract scene elements and respective feature/characterizations from the sample video feed. The extracted information may be segmented and packaged into one or more alert condition parameters according to embodiments of the present invention.

Recognizing and indicating an alert condition of a specific alert condition type based on the appearance, as inputs, of scene elements whose presence correlates to the specific alert condition types may be implemented using one or more neural network designed and trained for the specific task of recognizing alert conditions of the specific alert condition. These neural networks can also be trained, for example using deep machine learning techniques, to recognize, classify or correlate various combinations of scene elements, as inputs, to various alert condition types, as neural network outputs. According further embodiments, neural network training and refinement may continue during detector operation, for example by factoring user responses to alert condition detections, which were reported to the user, as feedback to the neural network. Various combinations of rule engines, neural networks and other forms of AI, known today or to be devised in the future may be applicable to the present invention and may be used to correlate detected/characterized scene elements with corresponding alert conditions.

According to further embodiments of the present invention, an alert condition detector may include or be functionally associated with an alert condition predictor. An alert condition predictor according to embodiments may include a rules engine accessing data stores with scene element parameters or combinations which when appearing correlate with a precursor to an alert condition statistically likely to occur in the future. The alert condition predictor may also be comprised of a neural network trained to correlate specific combinations of characterized/detected scene elements to specific alert condition precursors. Various combinations of rule engines and neural networks may be used to correlate detected/characterized scene elements with corresponding alert condition precursors, each of which precursor may indicates a likely future occurrence of a specific alert condition.

Both detection and prediction of alert conditions according to embodiments of the present invention may trigger an alert condition notification being generated and sent to one or more users and or interested parties. The notification may be in the form of an audible/visible alarm, an email, a push notification to a cell phone or a digital message delivered through a dedicated notification application running on a computer or mobile computing device. Alert notifications may be generated and sent in varying formats and through various messaging paths, wherein each format and messaging path may be associated with a different level of intrusiveness. Assessment/detection of a relatively more urgent alert conditions, such as a fallen elderly person or crying child, may trigger a relatively more intrusive and more distributed notification than would detection of a relatively lower urgency condition, such as for example, an assessment that the household lights are on while no-one is at home.

An alert condition notification handler according to embodiments of the present invention may generate different types of alert notifications depending upon an urgency level associated with a specific detected or assessed alert condition triggering the notification. Different alert conditions, according to embodiments of the present invention, may be associated with and possibly grouped into different alert condition types, and different alert condition types may be associated with different urgency levels. Varying urgency levels may be associated with or otherwise trigger different formats of alert notifications with varying intrusiveness levels and with varying distribution paths. The urgency level associated with an alert condition type may be indicated or designated by an urgency value linked to the alert condition type in a mapping table, data file, data structure (e.g. XML or JSON) or data store.

Upon determining that a specific detected/assessed alert condition is associated with a relatively low urgency value, an alert notification handler according to embodiments may generate a low intrusiveness type alert notification such as for example an email, an event log entry, etc. Whereas, upon determining that a specific alert condition is associated with a relatively higher urgency level or value, the alert notification handler may generate for that condition more intrusive alert notifications, such as automated phone call(s), push notifications, application alarm triggers, etc.

Deciding which alert type notification to generate responsive to which assessed/detected condition type, that is, mapping alert condition types of alert conditions detected within a given coverage area to corresponding alert notification types for issuing alert notifications, may be at least partially based on parameters and/or instructions associated with a system specific coverage area type (e.g. home, office, street, etc.), a specific monitored subject (e.g. little Emma or Grandpa), a specific category of subjects (e.g. babies, children, elderly, adults known to system, adults not known to system, etc.) and/or with a specific monitoring user. The instructions may be stored within an operating profile which may be predefined and used by the alert condition handler according to embodiments of the present invention. According to further embodiments, the profile may be adaptive and may be modified responsive to feedback from recipients of the alert condition notifications. The profiles may be stored in one or more data stores integral or otherwise associated with a notification handler according to embodiments of the present invention. One data store may include parameters mapping alert condition types to urgency levels or values. Another data store may include parameters mapping urgency levels to specific notification formats and or notification distribution paths ways, collectively referred to as notification protocols.

Embodiments of the present invention may include an alert notification handler adapted to manage delivery of generated alert notifications and to process responses to delivered alert notifications. The alert notification handler may generate and may convey an alert notification to a communication device of a designated alert notification recipient, and the handler may prompt the recipient for a response to the alert notification. The recipient's response to the alert notification may be significant and may cause the alert notification handler to escalate the alert notification, for example to send the alert to additional recipients including to medical and law enforcement services. Conversely, when the recipient's response to the alert notification is passive or dismissive, the response may cause the alert notification handler to simply log a delivery and delivery confirmation of the alert notification.

According to further embodiments of the present invention, a passive or dismissive response from a recipient to an alert notification corresponding to a detected alert condition of a specific alert condition type (e.g. "The kids are watching TV for more than an hour") may server to: (a) reduce a sensitivity of the alert condition detector to scene elements associated with alert conditions of the specific alert condition type; (b) reduce an urgency value associated with specific alert condition type; and or (c) alter the profile which maps detected alert condition types to alert notifications types such that a detection of and alert condition of the specific alert condition type triggers a relatively lower intrusiveness type of alert than previously mapped to the specific alert condition type. Likewise, a significant or aggressive response from a recipient to an alert notification corresponding to a detected alert condition of a specific alert condition type (e.g. "The door to backyard has been left open") may server to: (a) increase a sensitivity of the alert condition detector to alert conditions of the specific alert condition type; (b) increase an urgency value associated with specific alert condition type; and or (c) alter the profile data store which maps detected alert condition types urgency levels to alert notification formats, such that future detection of an alert condition of a specific alert condition type triggers a relatively higher intrusiveness type of alert notification than previously triggered notification for alert conditions for the same specific alert condition type.

According to further embodiment, alert condition types and or the notifications they trigger may be user defined. A user may use a menu or a scripting language to designate one or a combination of scene elements, of specific element types, whose appearance within a scene together or in a specific sequence constitutes a user specific alert condition. The user may also define an associated urgency level or otherwise define a notification protocol for each user defined alert condition type. Additionally, an actual recorded scene may be designated by a user as depicting an exemplary alert condition, and scene elements appearing within the designated scene may be extracted and stored within a data structure linking scene element combination to user designated alert condition. User defined alert condition type definitions, produced either by manual input or by example, may augment standard or generic alert condition definitions, such as for example "stranger alone in the home", "child falling", etc. with scene scenarios having subjective relevance to the user, such as for example "delivery guy left package in the wrong location", "dog stepped outside his authorized territory", "Child came home early", etc.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
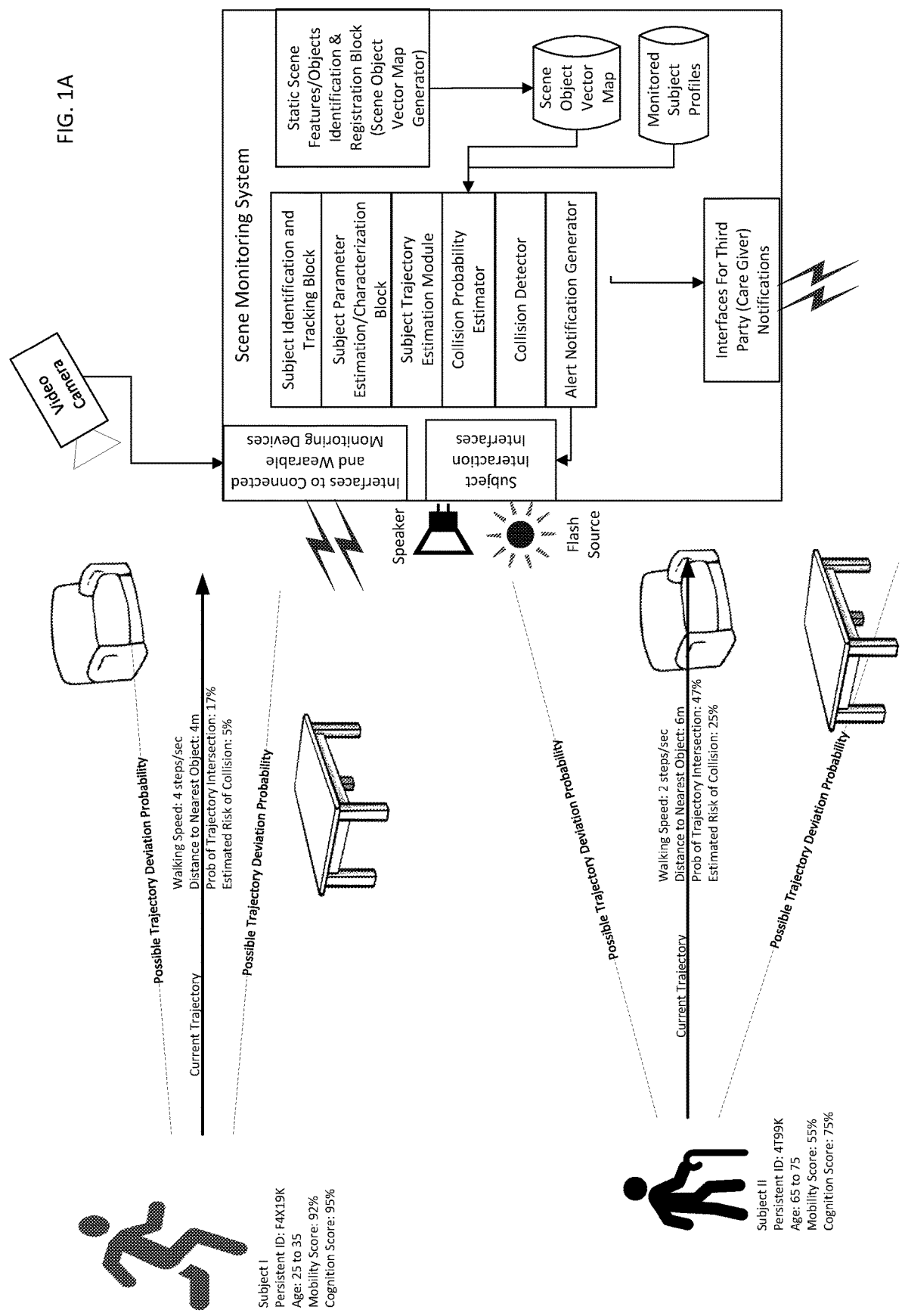
FIG. 1A is a conceptual illustration an exemplary monitoring system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like. Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

Turning now to FIG. 1a. there is shown an exemplary scene monitoring system according to embodiments of the present invention, monitoring two subjects. The first subject is a younger male with higher mobility and cognitive skills, while the second is an older man with lower physical and cognitive abilities. Accordingly, the system assigns the older man a higher probability of having an incident, collision or fall, than it does to the younger subject given their respective trajectories within their respective paths. The system assumes a higher possibility of path deviation for the older less mobility able subject and accordingly calculates a large set of options for collision with object in proximity of the older subject.

The system includes, on top of series of image/senor feature extractors, a series of object, subject, movement, behavior and pattern estimators/classifiers, which convert basic image features from a camera feed into subject parameters and activity information. Likewise, object classification and characterization is provided to complete an understanding of object placement and attributes in the scene and in relation to subjects moving through the scene.

Figure 1B:
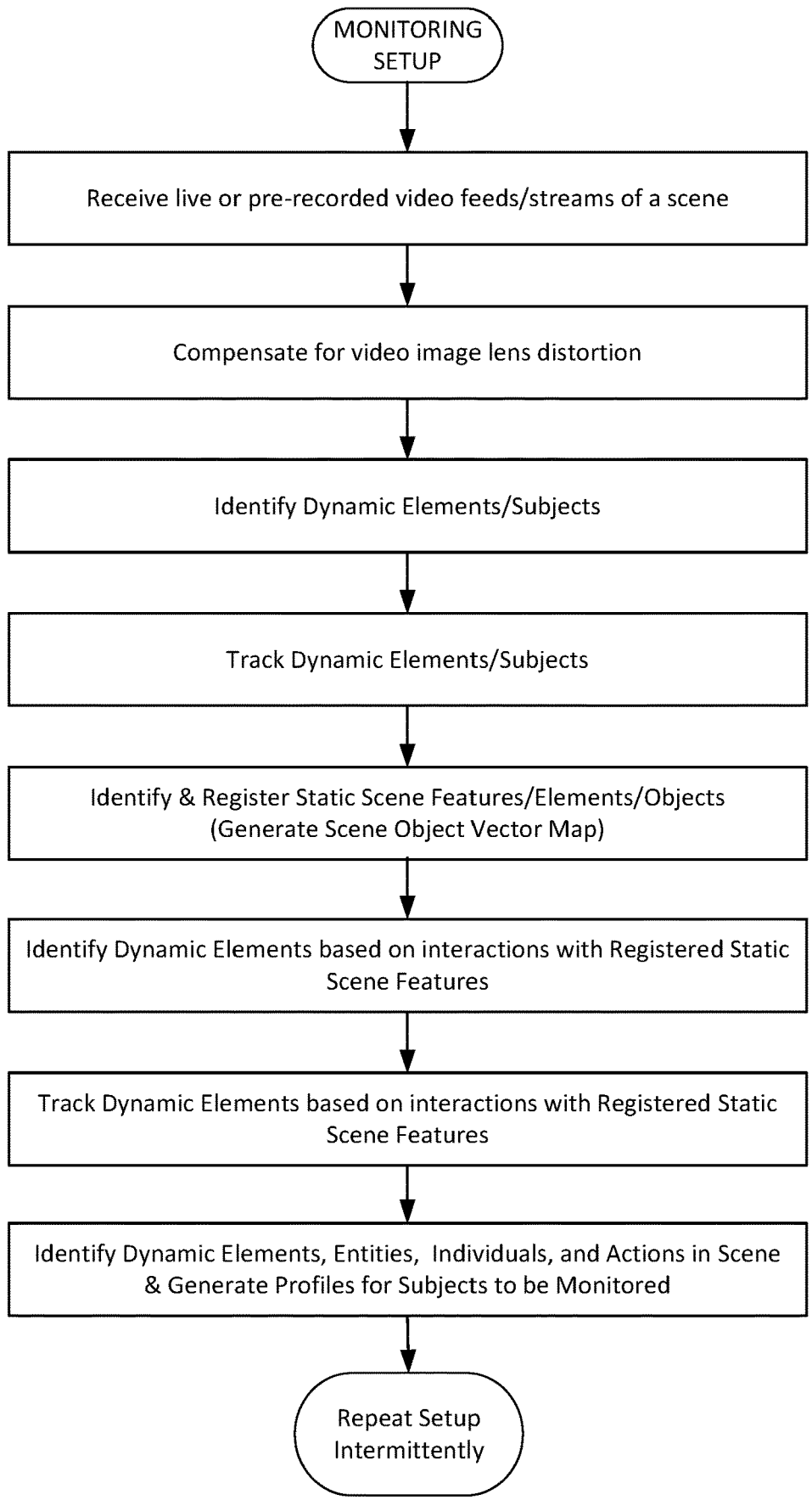
FIG. 1B is a flowchart including an exemplary set of steps, many repeating or running continuously, for setting up one or more systems in accordance with embodiments of the present invention.
Figure 1C:
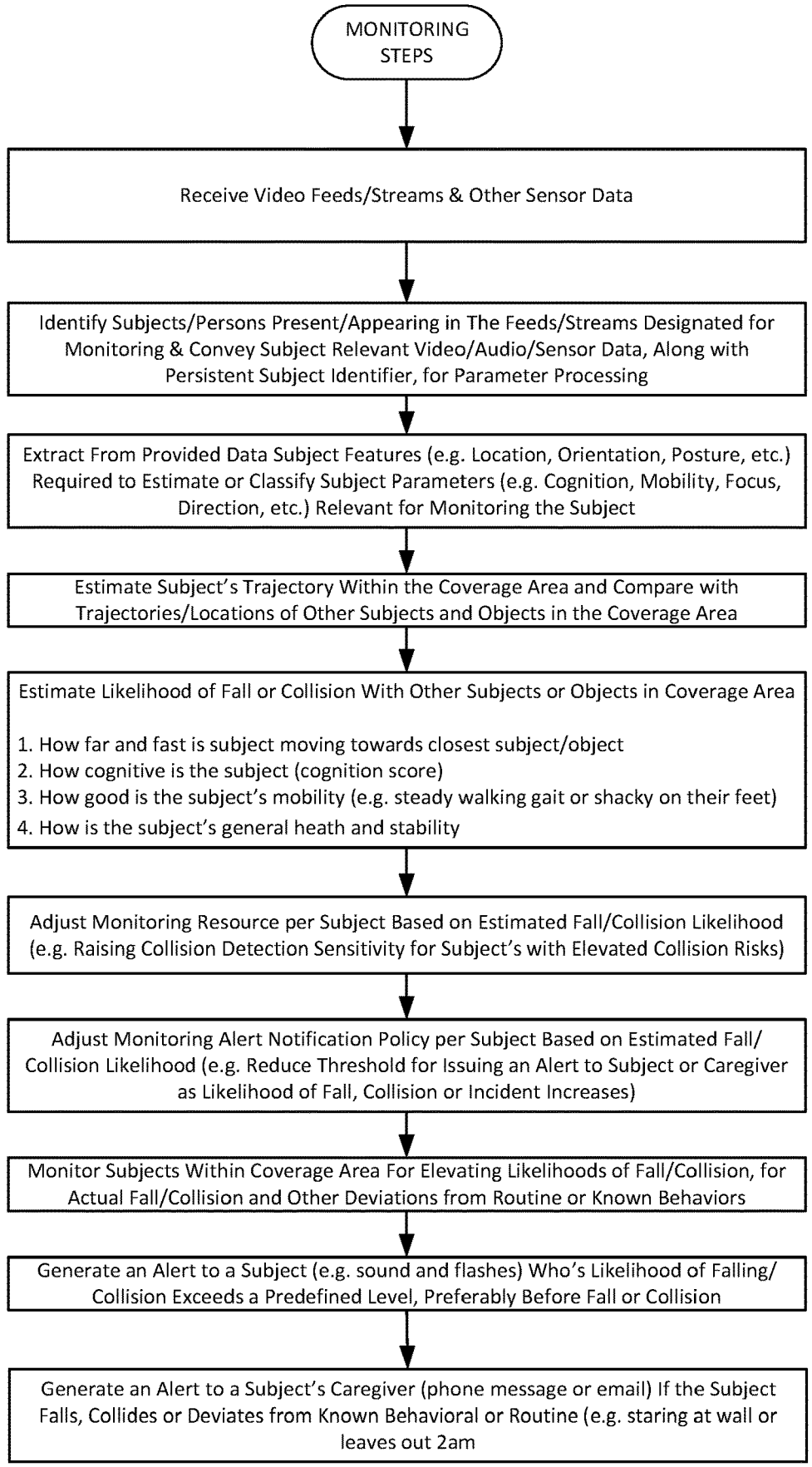
FIG. 1C is a flowchart including an exemplary set of steps, some repeat or running continuously, for performing scene monitoring in accordance with embodiments of the present invention.

Interaction between subjects and object of a scene is continuously detected, quantified and risk assessed. The steps for initiating systems according to embodiment of the present invention are listed in FIG. 1b. The steps of operating systems in accordance with embodiments of the present invention are listed in FIG. 1c. Some steps are repeated, while others are continuously executed.

The following figures relate specific embodiments of preparing to perform scene feed inspection and feature extraction. They also include different techniques for estimating subject location and motion dynamics using a combination of scene references and dynamic edge vector calculations and correlations.

Figure 2A:
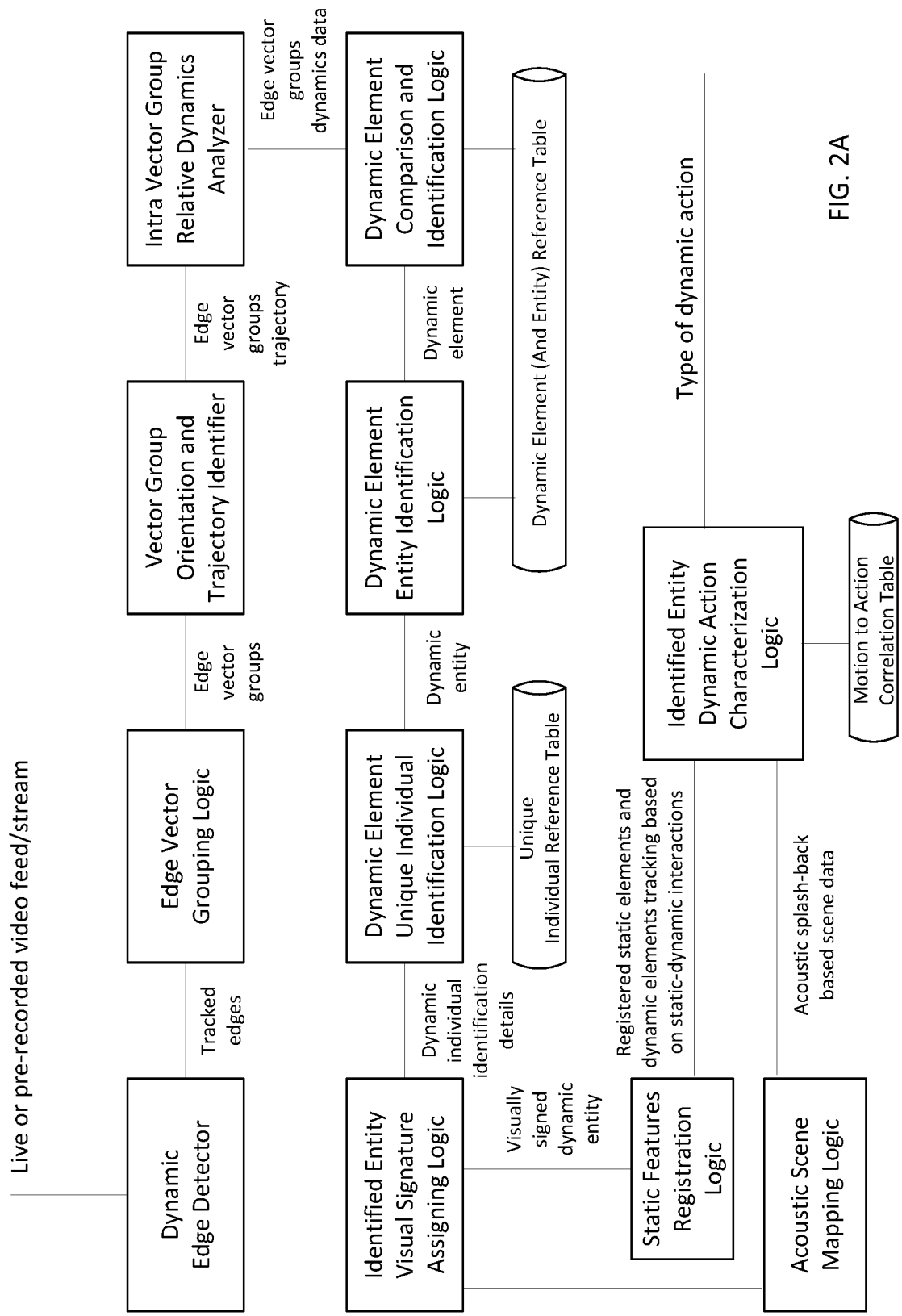
FIG. 2A shows a functional block diagram of an exemplary video feed or video stream processing engine adapted to characterize and optionally meta-tag a video feed/stream, in accordance with embodiments of the present invention.
Figure 2B:
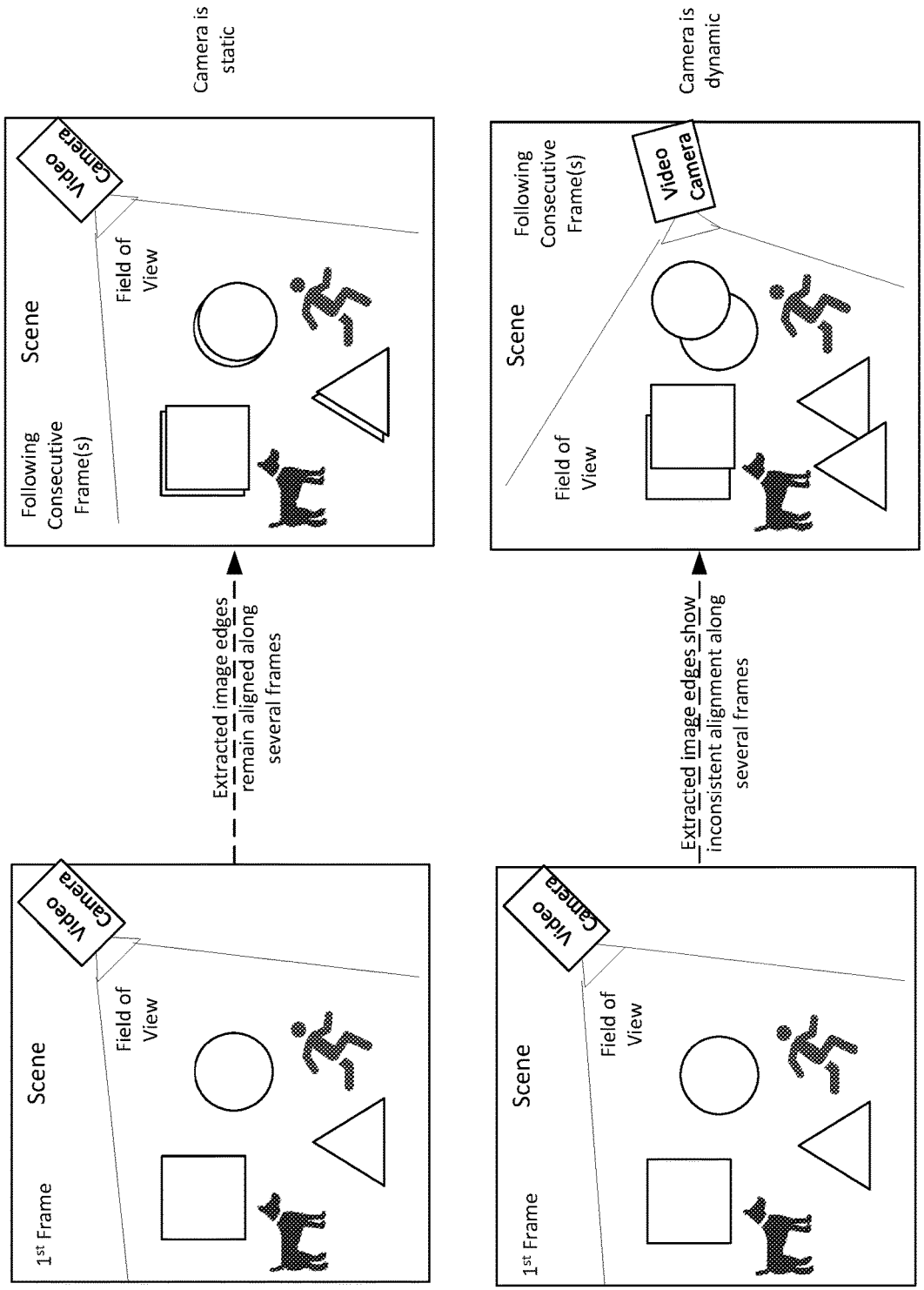
FIGS. 2B-2G show diagrams exemplifying the main steps executed by an exemplary video feed or video stream processing engine adapted to characterize and optionally meta-tag a video feed/stream, in accordance with embodiments of the present invention.
Figure 2C:
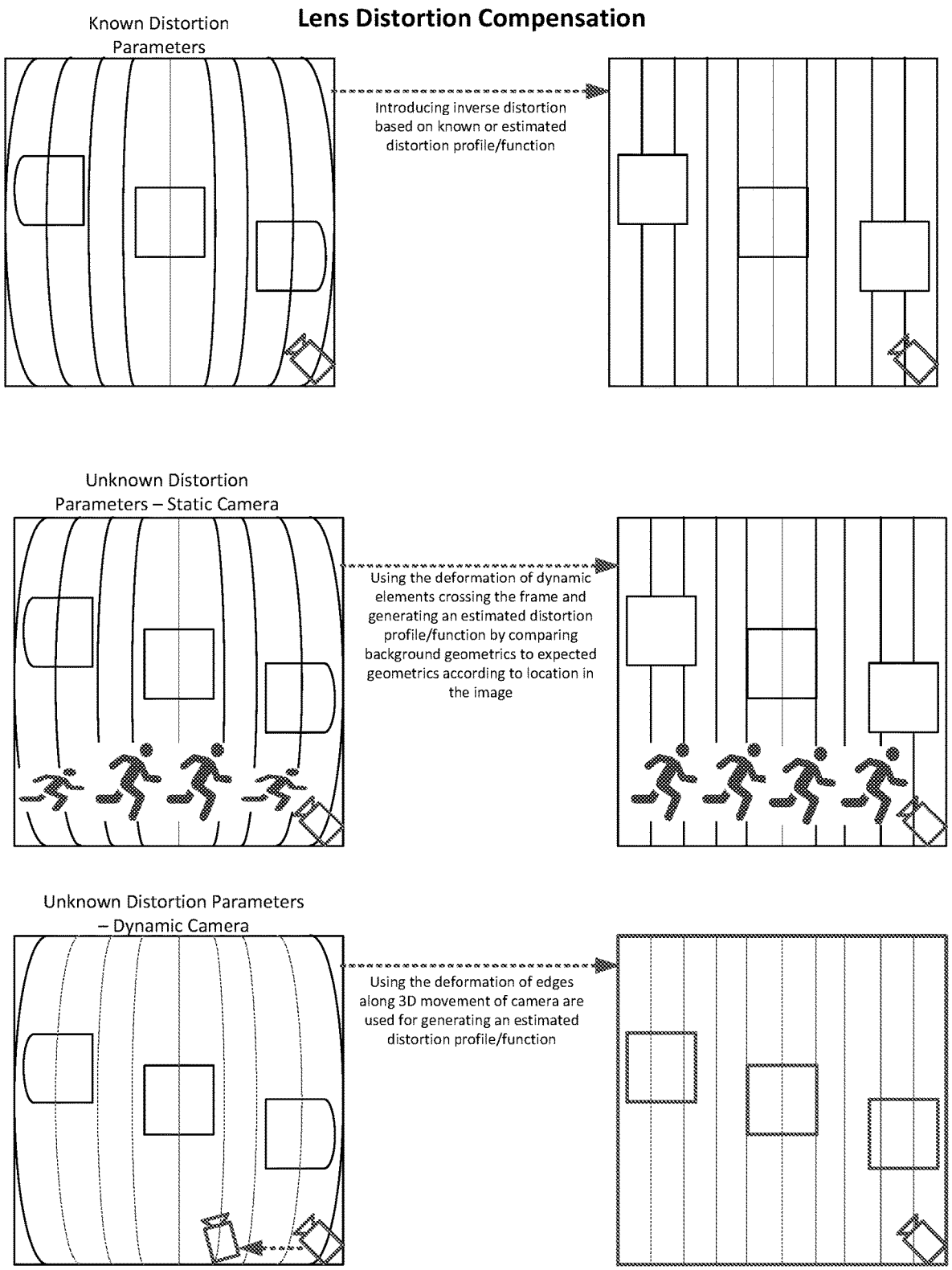
Figure 2D:
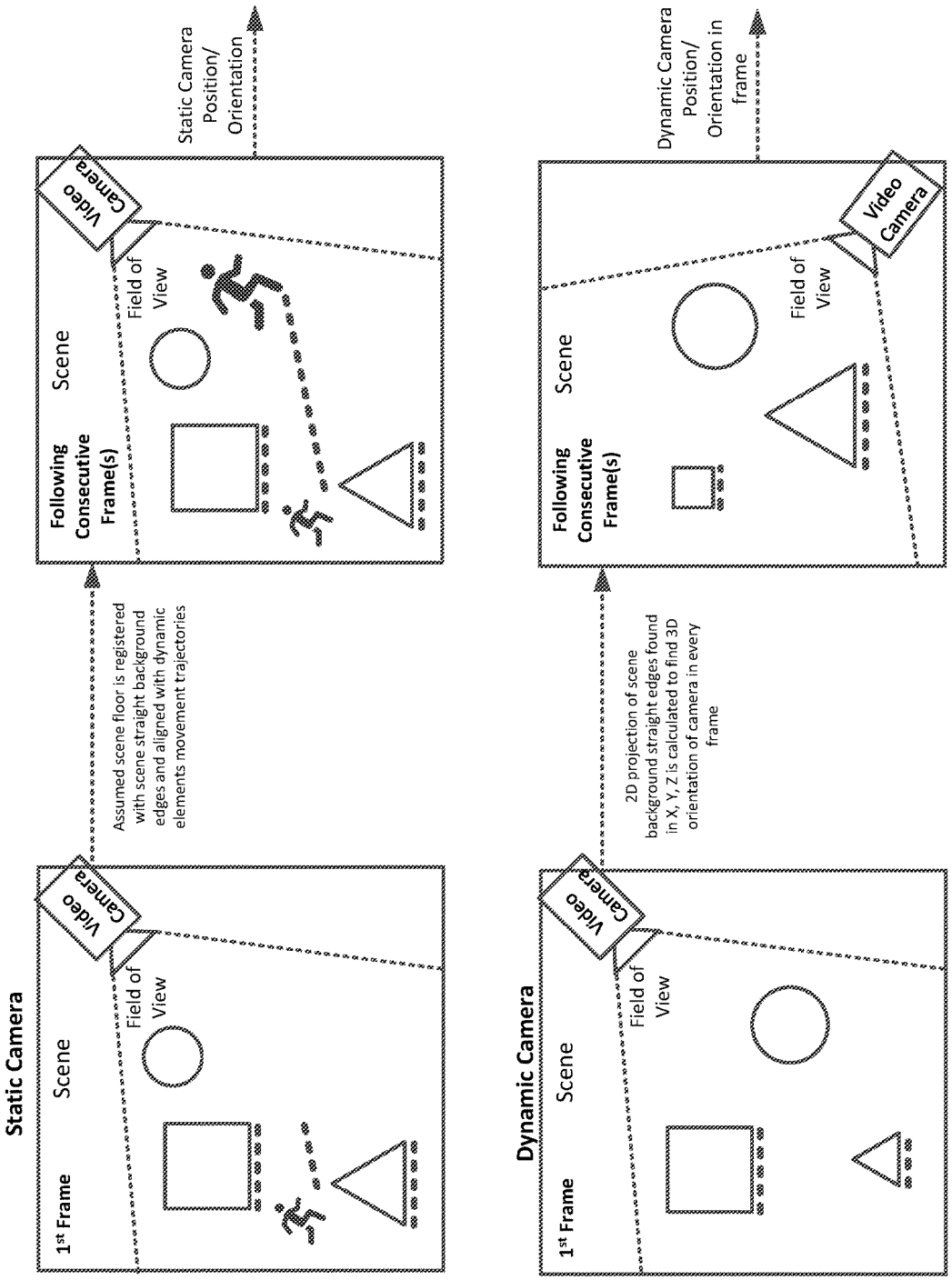
Figure 2E:
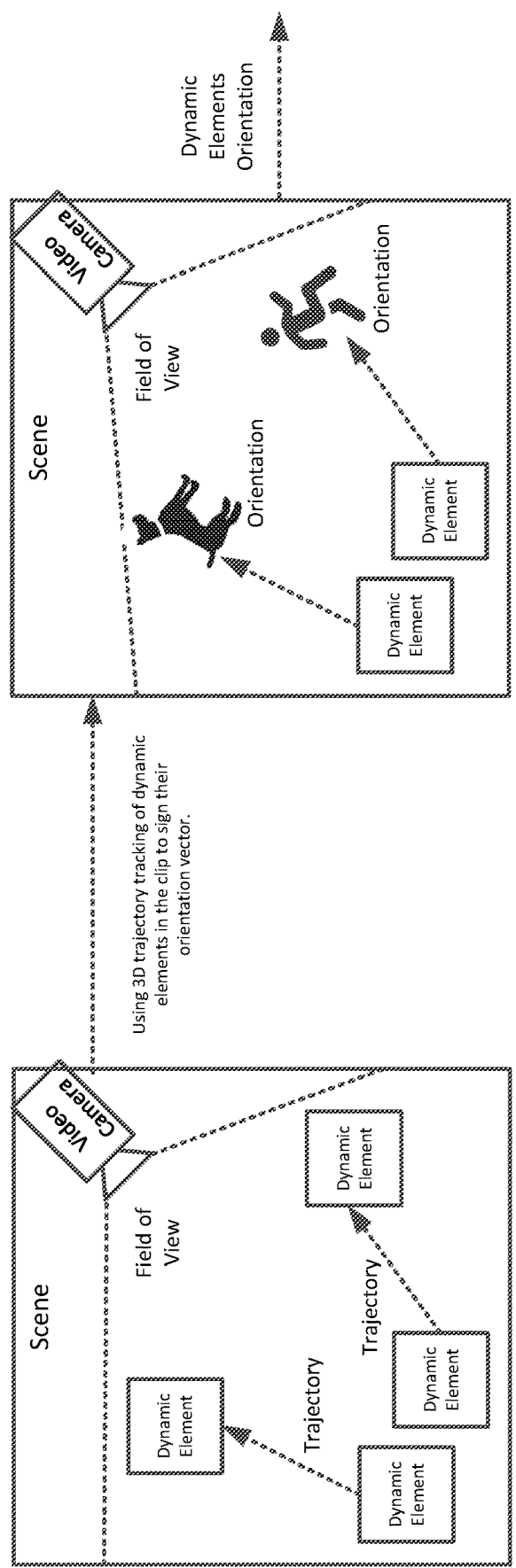
Figure 2F:
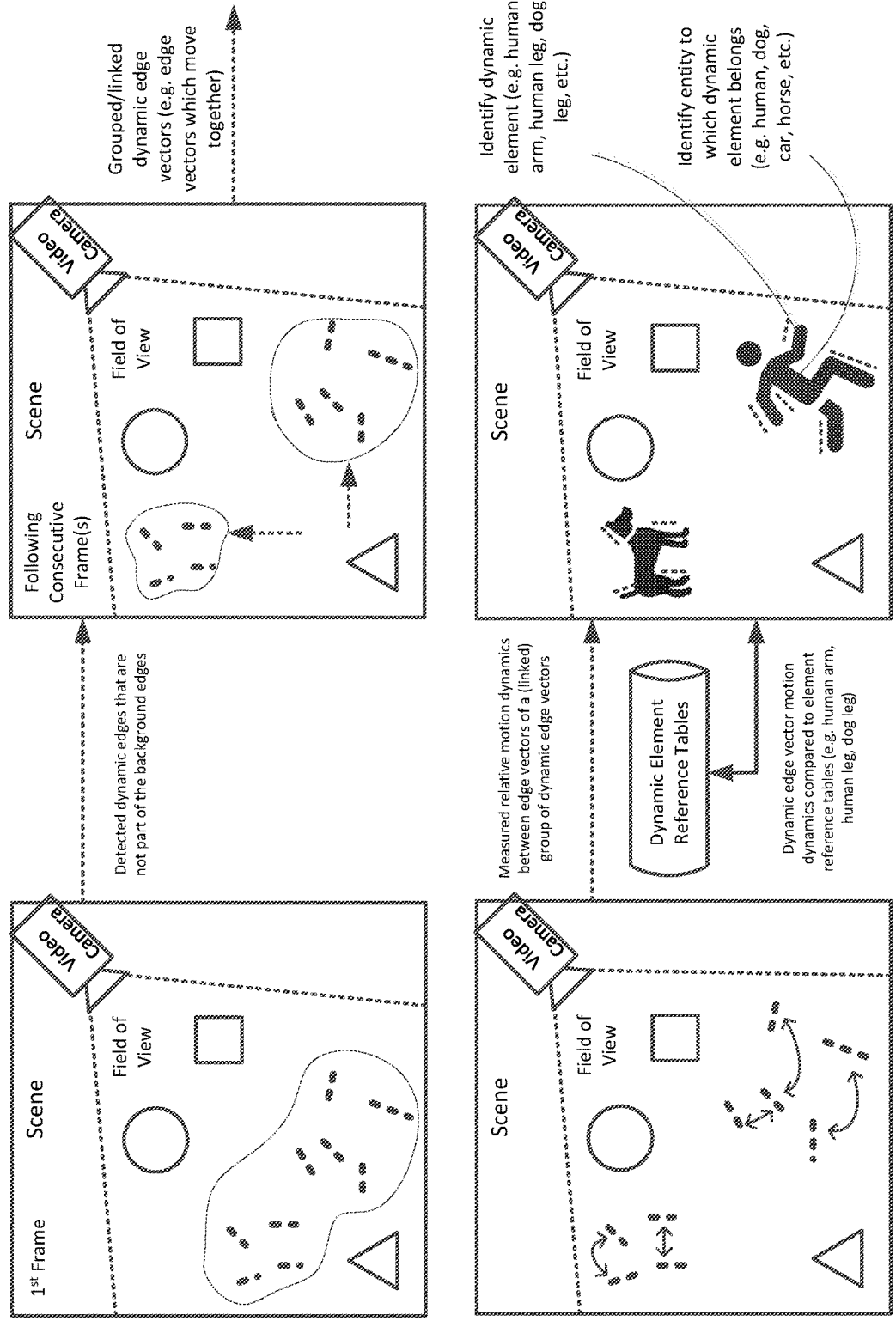
Figure 2G:
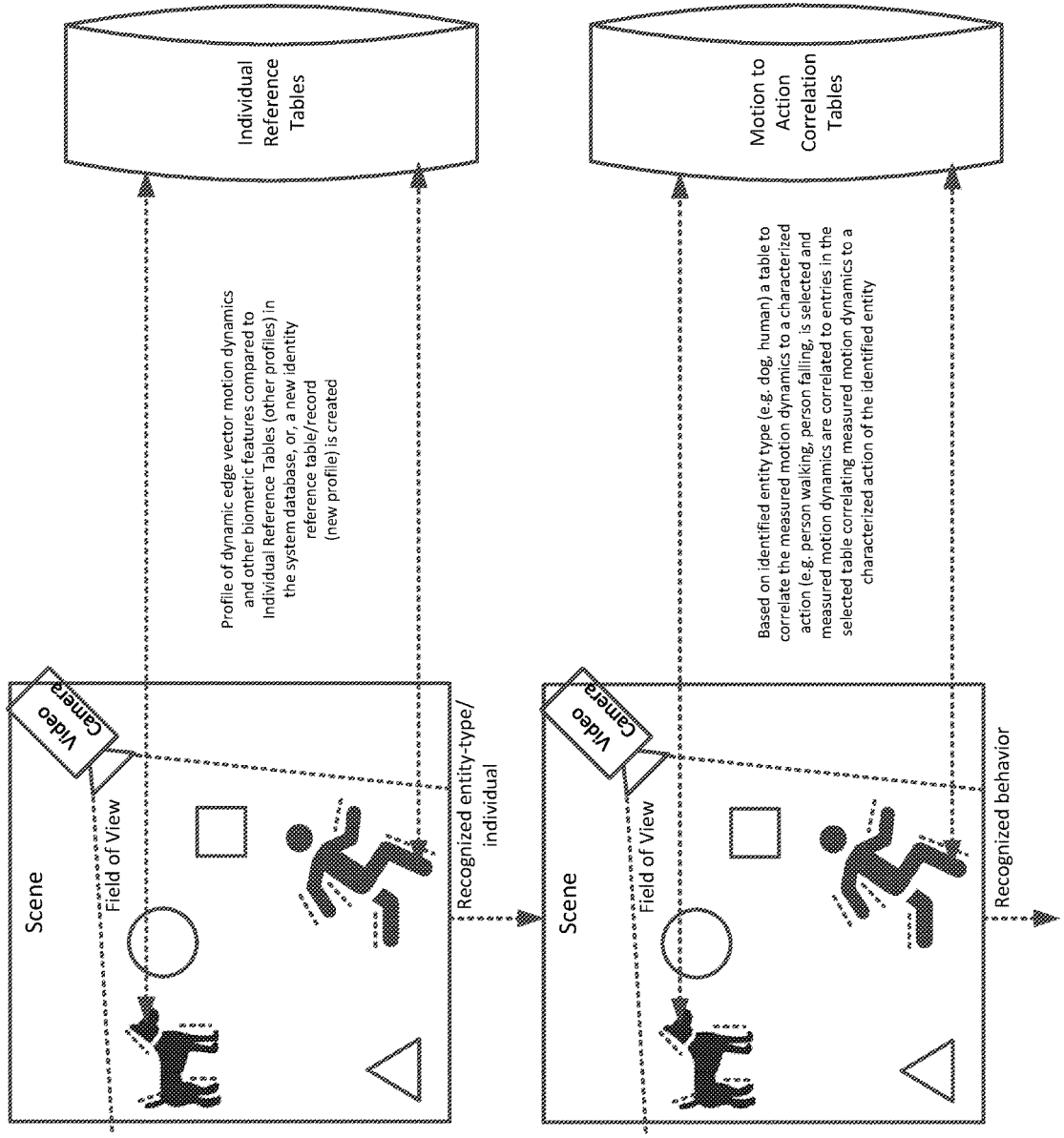

Turning now to FIG. 2A, there is shown a functional block diagram of an exemplary video feed or video stream processing engine adapted to characterize and optionally meta-tag a video feed/stream, in accordance with embodiments of the present invention. Live or pre-recorded video feed/stream is received by the processing engine. A Dynamic Edge Detector identifies and tracks dynamic edges in the video feed. An Edge Vector Grouping Logic groups the identified edge vectors. A Vector Group Orientation and Trajectory Identifier finds the trajectory and orientation of the edge vector groups in the scene. An Intra Vector Group Relative Dynamics Analyzer extracts edge vector groups' dynamics data. A Dynamic Element Comparison and Identification Logic references a Dynamic Element Reference Table for finding the types of dynamic elements identified in the scene. A Dynamic Element Entity Identification Logic references a Dynamic Entity Reference Table for finding the type of dynamic entities identified in the scene. A Dynamic Element Unique Individual Identification Logic references a Unique Individual Reference Table for finding the individual details of similar entities identified in the scene. An Identified Entity Visual Signature Assigning Logic visually signs dynamic entities in the scene for improved tracking. And, an Identified Entity Dynamic Action Characterization Logic references a Motion to Action Correlation Table for finding the type of dynamic actions performed in the scene.

In FIGS. 2B-2G there are shown, diagrams exemplifying the main steps executed by an exemplary video feed or video stream processing engine adapted to characterize and optionally meta-tag a video feed/stream, in accordance with embodiments of the present invention. The exemplified steps shown, include: a static/dynamic camera type decision process (2B); a lens distortion compensation process (2C); a camera positioning within scene process (2D); a dynamic entity 3D orientation and trajectory vectors estimation process (2E); a dynamic element identification and tracking process (2F); and a dynamic entity recognition and behavior analysis process (2G).

Figure 3A:
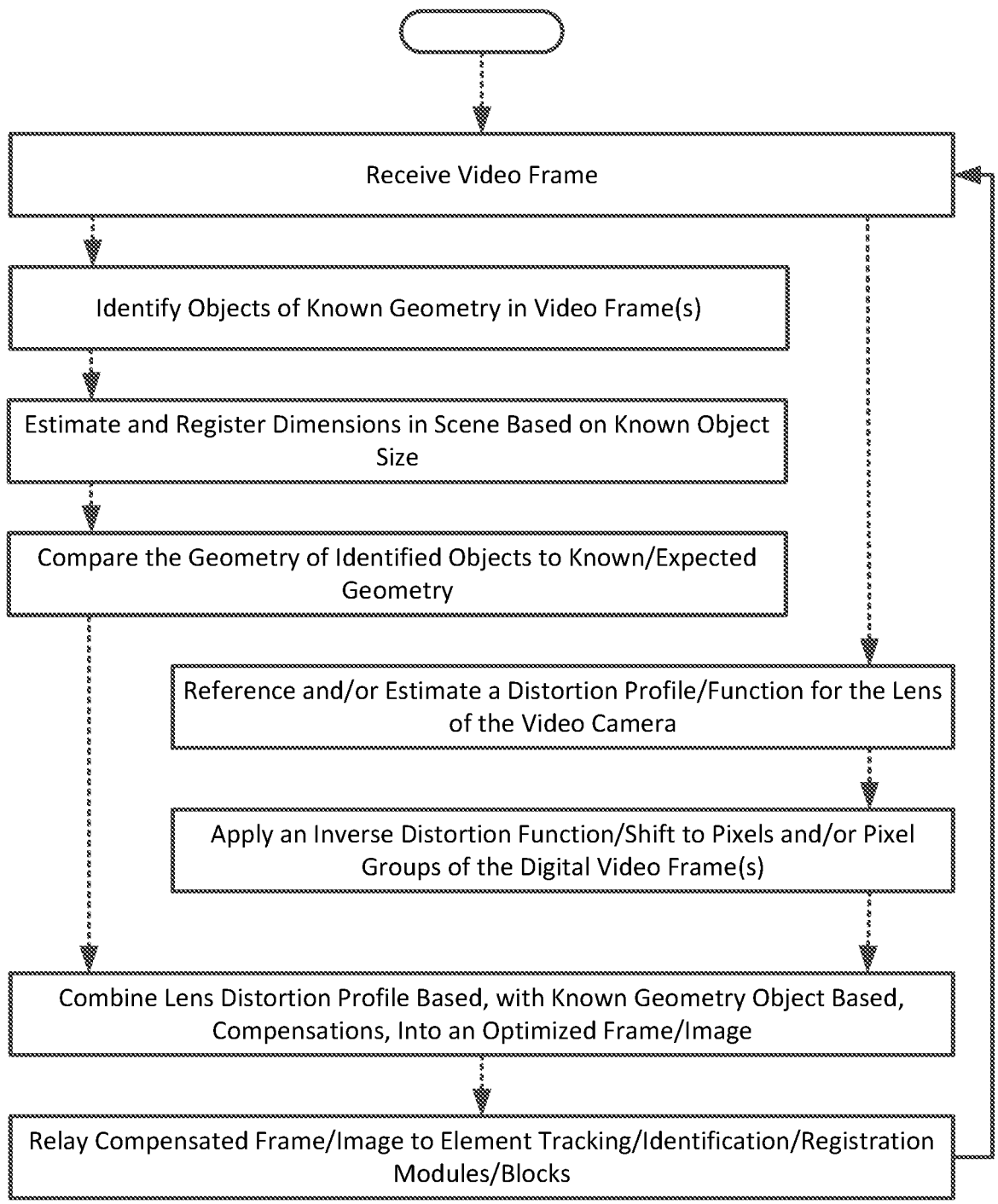
FIG. 3A is a flowchart of the main steps of an exemplary imaging path (lens or other elements) distortion compensation method, in accordance with embodiments of the present invention.

In FIG. 3A there is shown, a flowchart of the main steps of an exemplary imaging path (lens or other elements) distortion compensation method, in accordance with embodiments of the present invention.

Figure 3B:
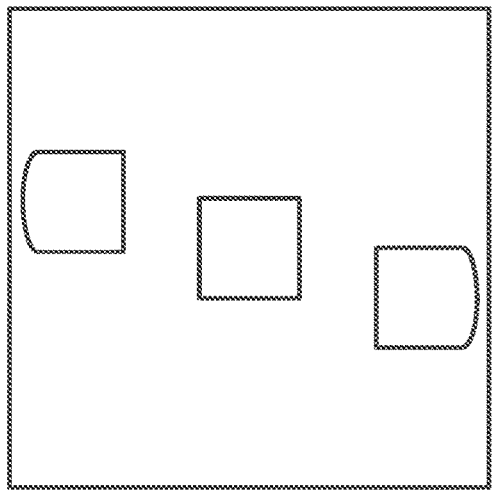
FIG. 3B shows exemplary effects of the exemplary distortion compensation method, including: raw image, image with lines indicating distortion bending vector in regions, calculated inverse bending vectors to compensate, and clean and compensated image, in accordance with embodiments of the present invention.
Figure 3B:
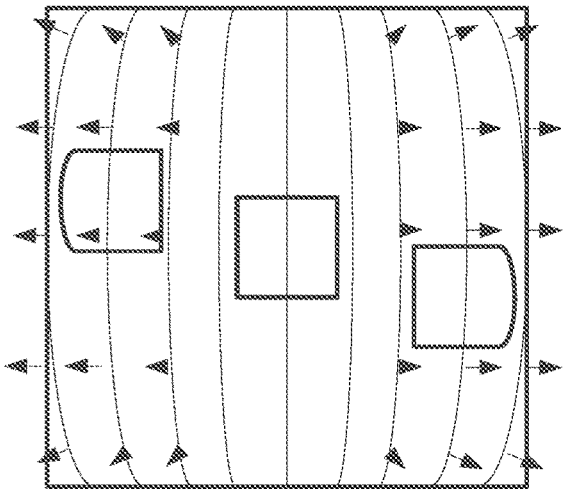
Figure 3B:
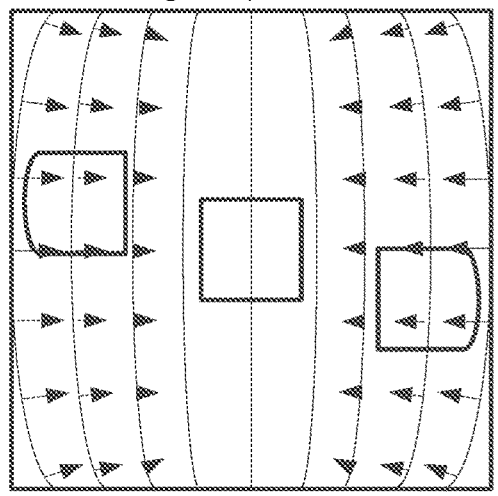
Figure 3B:
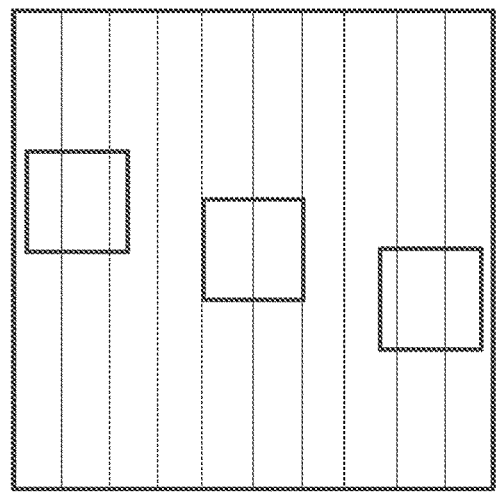

In FIG. 3B there are shown, the effects of the exemplary distortion compensation method, including schematic illustrations of: a raw image; an image with lines indicating distortion bending vectors in different regions; a set of calculated inverse bending vectors to compensate for the distortion; and a clean and compensated image.

Figure 4:
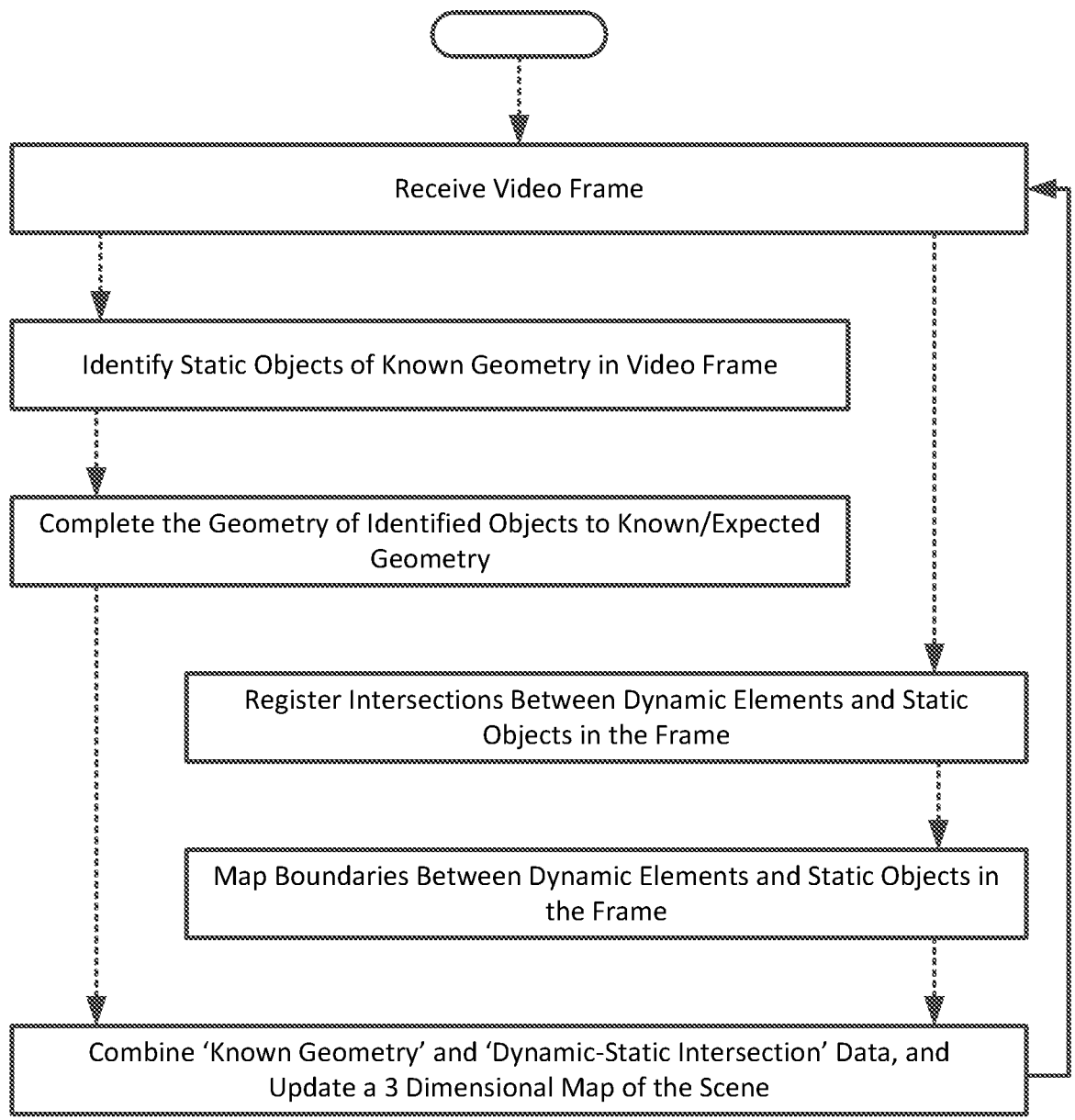
FIG. 4 is a flowchart of the main steps of an exemplary static scene element (i.e. background) registration method, including: following straight lines, checking intersections with dynamic elements, and iteratively completing a 3D map from multiple images at different perspectives, in accordance with embodiments of the present invention.

In FIG. 4 there is shown, a flowchart of the main steps of an exemplary static scene element (i.e. background) registration method, including: following straight lines, checking intersections with dynamic elements, and iteratively completing a 3D map from multiple images at different perspectives, in accordance with embodiments of the present invention.

Figure 5:
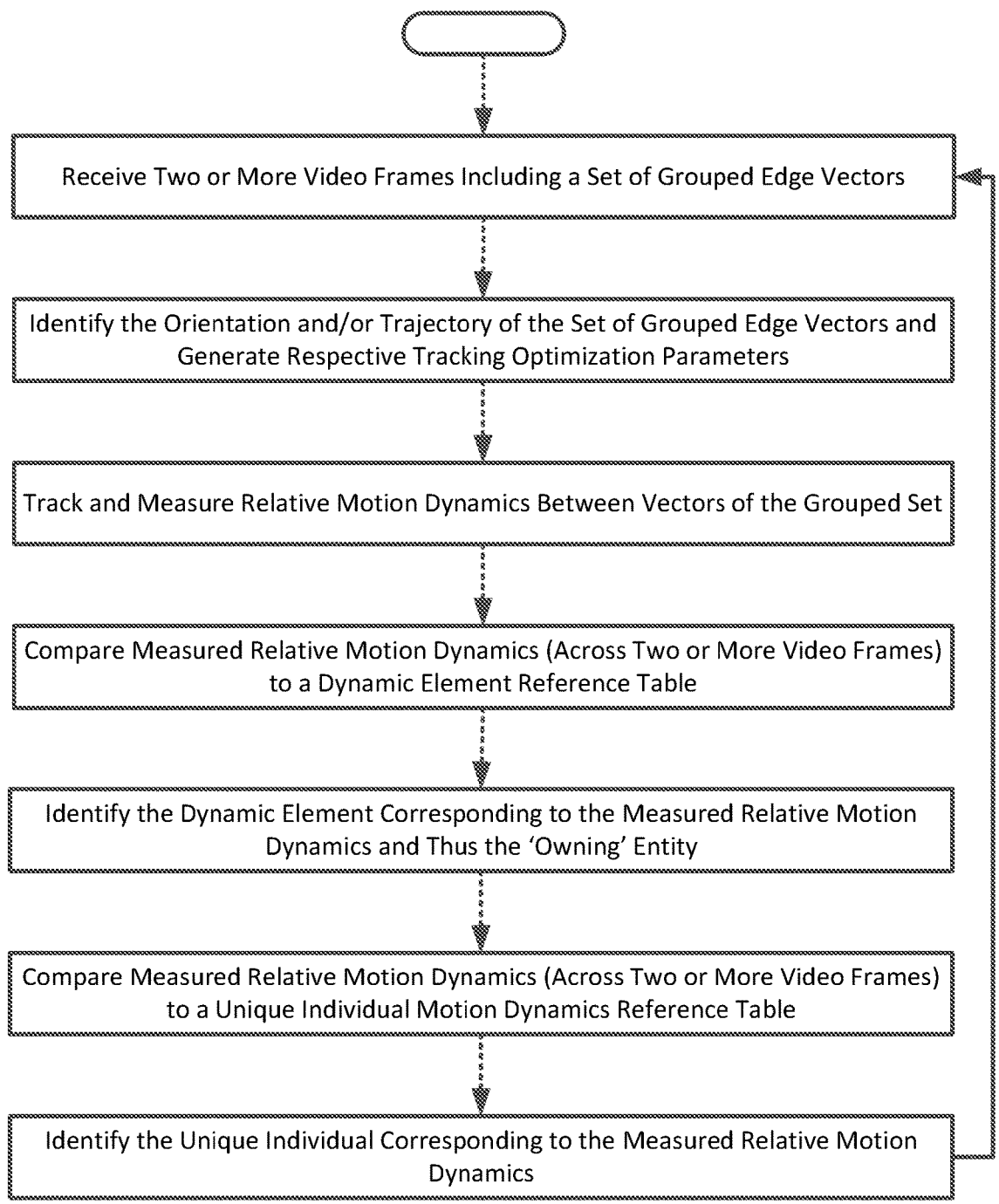
FIG. 5 is a flowchart of the main steps of an exemplary dynamic elements detection and tracking method within a video feed of a scene, and the identification of the entity types and individuals to which the dynamic elements belong, in accordance with embodiments of the present invention.

In FIG. 5 there is shown, a flowchart of the main steps of an exemplary dynamic elements detection and tracking method within a video feed of a scene, and the identification of the entity types and individuals to which the dynamic elements belong, in accordance with embodiments of the present invention.

Figure 6:
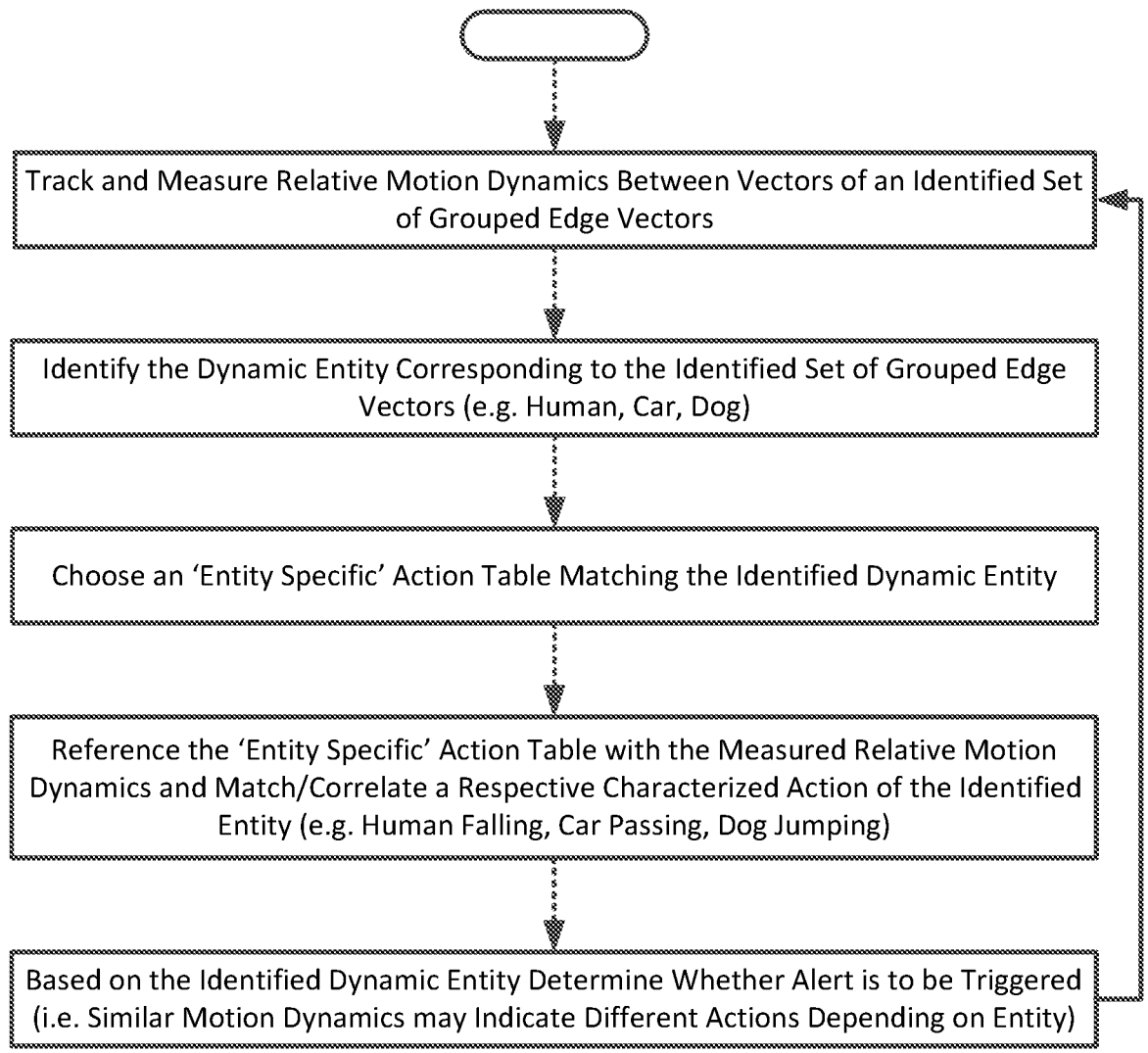
FIG. 6 is a flowchart of the main steps of an exemplary motion characterization method, including the choosing/selection of an entity specific motion to action table, in accordance with embodiments of the present invention.

In FIG. 6 there is shown, a flowchart of the main steps of an exemplary motion characterization method, including the choosing/selection of an entity specific motion to action table, in accordance with embodiments of the present invention.

The processes and displays presented herein are not inherently related to any particular computer, device, system or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to some embodiments of the present invention, a method of registering one or more features within an image frame of a video stream, may comprise: executing an edge detection algorithm for substantially each of a consecutive series of image frames to detect one or more dynamic edges across the consecutive series of image frames; tracking and parameterizing movement of detected dynamic edges across the consecutive series of image frames to generate a set of motion dynamic parameters; and correlating the motion dynamic parameters with a subject type and designating a pixel group adjacent to the one or more dynamic edges with the subject type.

According to some embodiments of the present invention, the method may further comprise: accessing a subject type specific motion data-store and correlating the motion dynamic parameters with a record of the data-store, wherein the record indicates a specific motion type; accessing an individual recognition specific individual data-store and correlating the motion dynamic parameters with a record of the data-store, wherein the record indicates a specific individual; identifying background elements in the video stream image frame; digitally correcting optical distortions caused by movements of an imaging device acquiring the video feed; digitally correcting optical distortions caused by imaging device lens having a known lens distortion; digitally correcting optical distortions caused by imaging device lens having an unknown lens distortion; executing an edge detection algorithm to detect one or more static edges of static elements across the consecutive series of image frames, and designating a static pixel group adjacent to the one or more of the static edges, with a specific static element from within the static elements when the video feed source is a static video camera; and/or executing an edge detection algorithm to detect one or more static edges of static elements across the consecutive series of image frames, and designating a registered static pixel group adjacent to the one or more of the static edges, with a specific static element from within the static elements when the video feed source is a dynamic video camera.

According to some embodiments of the present invention, a method of estimating distances of one or more features within an image frame of a live video feed, may comprise: identifying two or more objects within the image frame; estimating a relative distance order of identified objects; emitting an acoustic burst from a source at or in proximity of the video feed; detecting acoustic echo patterns and estimating distance of each pattern based on time of acoustic time of flight; and correlating at least one acoustic echo pattern estimated distance with an identified object within the image frame.

According to some embodiments of the present invention, a method of estimating a distance of one or more features within an image frame of an audio-video feed, may comprise: detecting an audio burst starting on an audio channel of an audio-video feed, wherein a rising edge of the audio burst is associated with a first timestamp of the audio-video feed; identifying within the audio-video feed a video frame, acquired before the first timestamp, including an object-action which was a source of the audio burst, wherein an "object-action" is an action associated with one or more specific scene objects having an acoustic and a visual signature; calculating a temporal distance between acquisition of the frame with the object-action and the first timestamp; and estimating a physical distance of the object-action from a source device of the audio-video feed by multiplying an estimated speed of sound by the calculated temporal distance.

According to some embodiments of the present invention, a system for registering one or more features within an image frame of a video stream, may comprise: a dynamic edge detector for executing an edge detection algorithm for substantially each of a consecutive series of image frames to detect one or more dynamic edges across the consecutive series of image frames; a dynamic edge vector dynamics analyzer for tracking and parameterizing movement of detected dynamic edges across the consecutive series of image frames to generate a set of motion dynamic parameters; a dynamic entity identification logic for correlating the motion dynamic parameters with a subject type; and a dynamic entity signature assigning logic for designating a pixel group adjacent to the one or more dynamic edges with the subject type.

According to some embodiments of the present invention, the system may further comprise: a dynamic action characterization logic for accessing a subject type specific motion data-store and correlating the motion dynamic parameters with a record of the data-store, wherein the record indicates a specific motion type; an individual recognition specific individual logic for accessing an individual recognition specific individual data-store and correlating the motion dynamic parameters with a record of the data-store, wherein the record indicates a specific individual; a static features registration module for identifying background elements in the video stream image frame; a camera type and lens distortion compensation module for digitally correcting optical distortions caused by movements of an imaging device acquiring the video feed; a camera type and lens distortion compensation module for digitally correcting optical distortions caused by imaging device lens having a known lens distortion; a camera type and lens distortion compensation module for digitally correcting optical distortions caused by imaging device lens having an unknown lens distortion; a static edge detector for executing an edge detection algorithm for substantially each of a consecutive series of image frames to detect one or more static edges across the consecutive series of image frames, and a static element signature assigning logic for designating a static pixel group adjacent to the one or more of the static edges, with a specific static element from within the static elements when the video feed source is a static video camera; and/or a static edge detector for executing an edge detection algorithm for substantially each of a consecutive series of image frames to detect one or more static edges across the consecutive series of image frames, and a static element signature assigning logic for designating a registered static pixel group adjacent to the one or more of the static edges, with a specific static element from within the static elements when the video feed source is a dynamic video camera.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A machine-based scene monitoring system for monitoring at risk persons within an environment, said system comprising;
   one or more scene monitoring sensors affixed within or around the environment, focused on a the environment, and configured to convert sensed information from the environment into digital information feeds processable by a digital processing platform;
   scene feature extraction and classification processors to receive the scene sensor feeds and to extract, classify and characterize scene element features, such as objects and subjects, appearing within the feeds, wherein subjects include at risk persons and objects include furniture and other items subjects may collide with;
   a subject trajectory estimation module to estimate a predicted trajectory of a monitored subject;
   an incident risk estimator to, based on scene information provided by said feature extraction and classification processors and said trajectory estimation module, estimate risk of incident such as a collision or fall of the monitored subject.

2. The system according to claim 1, further comprising an incident detector whose sensitivity and configuration in relation to a specific subject is adjusted based on the estimated risk of incident for the subject.

3. The system according to claim 2, further comprising an alert notification generator to issue an alert to a subject once their respective risk of incidence reaches a threshold level.

4. The system according to claim 2, further comprising an alert notification generator to issue an alert to a caregiver of a subject once their respective risk of incidence reaches a threshold level or after an incident is detected.

5. The system according to claim 1, wherein feature extraction relating to subjects is performed using dynamic edge detection techniques.

6. The system according to claim 1, further comprising a subject profile repository to save subject parameters including one or more of: (1) mobility scores, (2) cognition scores, (3) general health score, (4) behavioral patterns and (5) subject routines.

7. The system according to claim 2, wherein said incident detector indicates an incident when a subject deviates from a routine.

8. The system according to claim 7, wherein the said incident detector indicates a subject with below threshold level cognition deviates from a routine.

* * * * *